United States Patent [19]

Cosgrove

[11] Patent Number: 5,244,069
[45] Date of Patent: Sep. 14, 1993

[54] APPARATUS FOR PROTECTING MIXER TRUCK CHUTE AGAINST WEAR

[76] Inventor: James H. Cosgrove, 7964 Crystal Blvd., Diamond Springs, Calif. 95619

[21] Appl. No.: 942,817

[22] Filed: Sep. 10, 1992

[51] Int. Cl.⁵ .............................................. B65G 11/16
[52] U.S. Cl. .................................... 193/5; 193/25 A
[58] Field of Search .................... 193/3, 4, 5, 6, 33, 193/25 R, 25 A

[56] References Cited

U.S. PATENT DOCUMENTS

| | | |
|---|---|---|
| 2,421,977 | 6/1947 | Allen .................................. 193/25 R |
| 2,658,603 | 11/1953 | Fernald ............................ 193/25 R |
| 3,150,753 | 9/1964 | Ivanyi . |
| 3,508,405 | 4/1970 | Koch . |
| 4,054,194 | 10/1977 | Davis . |
| 4,529,660 | 7/1985 | Heim . |
| 4,574,933 | 3/1986 | Leinenger . |
| 4,645,055 | 2/1987 | Griese et al. . |
| 4,889,219 | 12/1989 | Key .................................... 193/25 R |
| 5,035,313 | 7/1991 | Smith . |

*Primary Examiner*—D. Glenn Dayoan
*Attorney, Agent, or Firm*—Thomas R. Lampe

[57] ABSTRACT

Apparatus for protecting the chute of a mixer truck from impact and wear. The apparatus includes a liner having a liner wall positionable over the chute. The liner is attached only at its upper end to the chute with the remainder of the liner being unattached and depending from the liner wall upper end. The liner is of unitary, molded plastic construction.

11 Claims, 2 Drawing Sheets

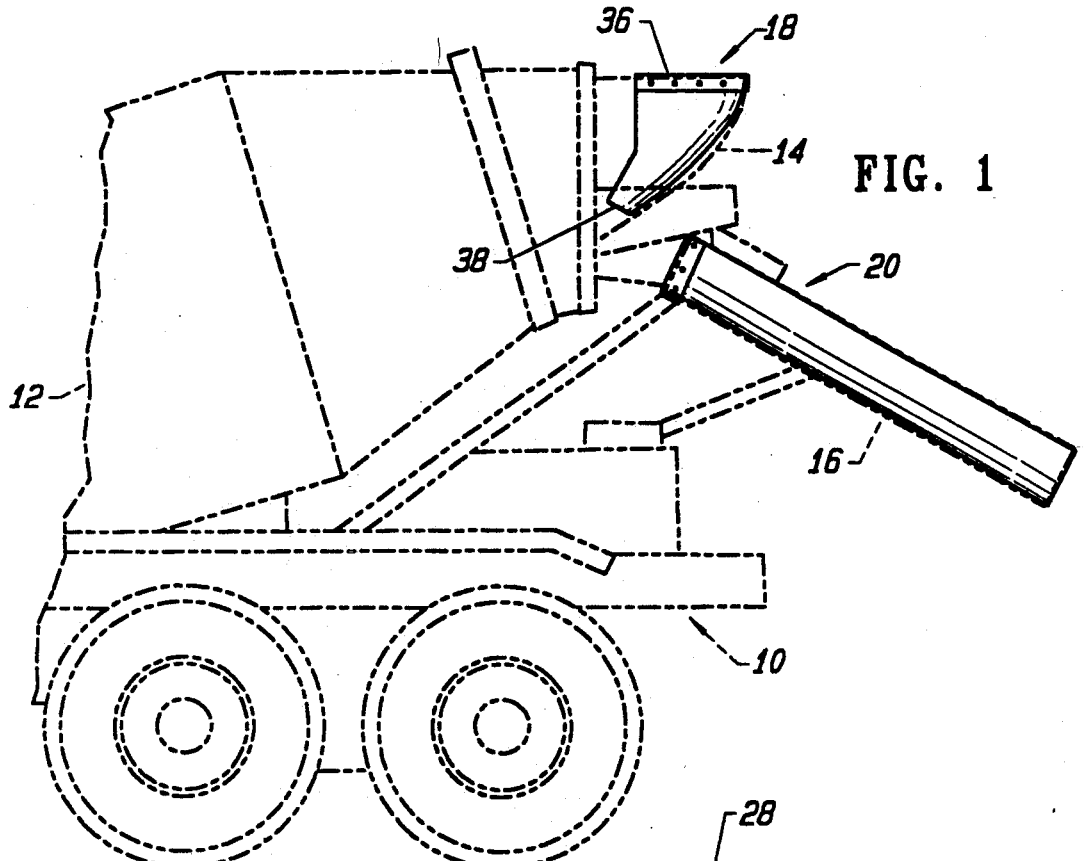

APPARATUS FOR PROTECTING MIXER TRUCK CHUTE AGAINST WEAR

TECHNICAL FIELD

This invention relates to apparatus for use in combination with a mixer truck having a chute for conveying fluent material to protect the chute against impact and wear.

BACKGROUND ART

Mixer trucks used to transport and dispense concrete and similar materials incorporate one or more chutes utilized to convey such material from one location to another. For example, most mixer trucks incorporate a hopper loader chute located at the mixer drum to direct fluent material into the drum. Also, discharge chutes (both primary chutes and extension chutes) are normally employed to convey the concrete or other material from the drum to a location at a work site.

Chutes associated with mixer trucks are subjected to a great deal of wear and tear, not only by the impact and abrasion resulting from movement of the concrete or other fluent material but also by the impact of other machinery or equipment. For example, hopper loader chutes are often struck and damaged by delivery spouts or conveyors utilized when filling the mixer drum. Impact and wear of the chutes will, over a period of time, result in significant deterioration thereof. Another contributing factor to such deterioration is exposure of the chutes to the liquid components of concrete and the like.

In order to avoid, or at least defer, the expenses associated with replacement of old chutes with new, attempts have been made to repair the chutes. One approach has been to weld liners of steel to the chutes. This is an expensive procedure and one which often can be carried out only once. Furthermore, chutes in a significant state of deterioration or chutes of certain types of materials are often not amenable to repair utilizing this approach. Use of steel or other metal liners also adds significant weight to the chute, which is undesirable.

Attempts have been made to coat chutes with plastic material; that is, a bond is created between the plastic and the chute material over the entire extent thereof. This causes difficulties due to the difference in coefficients of expansion of the two materials. Furthermore, any break in the coating will result in the underlying chute material coming into contact with liquid, thus causing rust which will over time significantly deteriorate the quality and strength of the chute. This same result can, of course, occur even when steel liners or plates are affixed to chutes. And it almost goes without saying that the various attempts to protect mixer truck chutes just described result in permanent alteration of the chutes. That is, the various liners and coatings become integral parts of the chutes, rendering further repair even more difficult, if not impossible.

A patentability search directed to the present invention located the following U.S. Pat. Nos.: 5,035,313, issued Jul. 30, 1991, 4,529,660, issued Jul. 16, 1985, 4,645,055, issued Feb. 24, 1987, 4,574,933, issued Mar. 11, 1986, 4,054,194, issued Oct. 18, 1977, 3,150,753, issued Sep. 29, 1964, and 3,508,405, issued Apr. 28, 1970.

Of these patents, U.S. Pat. No. 5,035,313 is worthy of particular comment. U.S. Pat. No. 5,035,313 discloses a dispensing chute for attachment to a mixer truck comprising a plurality of telescopically mounted sections. The chute sections are in the form of interlocking open metal frames having replaceable plastic liners affixed to the frames in the interior thereof. In other words, the liners, which are secured to the chute frames along the lengths thereof and are not moveable with respect to the frames, are not protective liners at all but rather parts of the chutes themselves.

U.S. Pat. No. 4,054,194 discloses a conveying chute for freshly mixed concrete made from a metal frame having a replaceable polyurethane liner. Again, the liner is a part of the conveyor and not a protective liner for protecting the conveyor. The liner is in the form of a sheet fixedly held to its frame by sets of bolts and nuts at each end of the frame.

DISCLOSURE OF INVENTION

The apparatus of the present invention is of relatively simple construction, facilitating ease of both attachment to and removal from a conventional chute of a mixer truck to act as a protective liner therefor. The apparatus thus can be replaced innumerable times by apparatus of like construction to afford protection for a mixer truck chute.

The apparatus of the present invention is tough and wear resistant. It is so constructed as to virtually eliminate the intrusion of water or other liquids between the apparatus and the chute with which it is employed, thus protecting the chute not only against wear and tear but also deterioration from rust.

The apparatus of the present invention is for use in combination with a mixer truck having a chute for conveying fluent material from a first location to a second location relative to the mixer truck. The chute has a conveyor wall with an upper end, a lower end, and a generally upwardly disposed fluent material support surface extending substantially continuously between the upper and lower ends.

The apparatus includes a liner having a liner wall positionable over the fluent material support surface of the chute conveyor wall for protecting the fluent material support surface against impact and wear. The liner wall has a bottom surface for engagement and generally conforming to the shape of the fluent material support surface. The liner wall additionally has an upper end, a lower end, and a top surface extending between the liner wall upper and lower ends.

Attachment means is provided for attaching the upper end of the liner wall to the chute at the upper end of the conveyor wall. The liner when so attached is otherwise unattached to the chute whereby the liner wall will depend from the liner wall upper end and whereby the liner wall bottom surface and the chute conveyor wall fluent material support surface will be capable of relative movement when the upper end of the liner wall is attached to the upper end of the chute conveyor wall.

The liner includes a down-turned lip at the upper end of the liner wall. The down-turned lip and the liner wall define a recess for receiving the upper end of the chute conveyor wall. The lip is of a size and configuration to cover the entirety of the chute conveyor wall upper end to prevent contact between the chute conveyor wall upper end and the fluent material as well as deter against intrusion of the fluent material between the chute and the liner.

Other features, advantages, and objects of the present invention will become apparent with reference to the following description and accompanying drawings.

BRIEF DESCRIPTION OF DRAWINGS

FIG. 1 is a partial, side view of a typical mixer truck depicted in phantom and illustrating two embodiments of apparatus constructed in accordance with the teachings of the present invention in solid lines;

FIG. 2 is a side, elevational view of one embodiment of the apparatus constructed in accordance with the teachings of the present invention;

FIG. 3 is a greatly enlarged, cross sectional, exploded view taken along the line 3—3 of FIG. 2;

MODES FOR CARRYING OUT THE INVENTION

Figure 4:
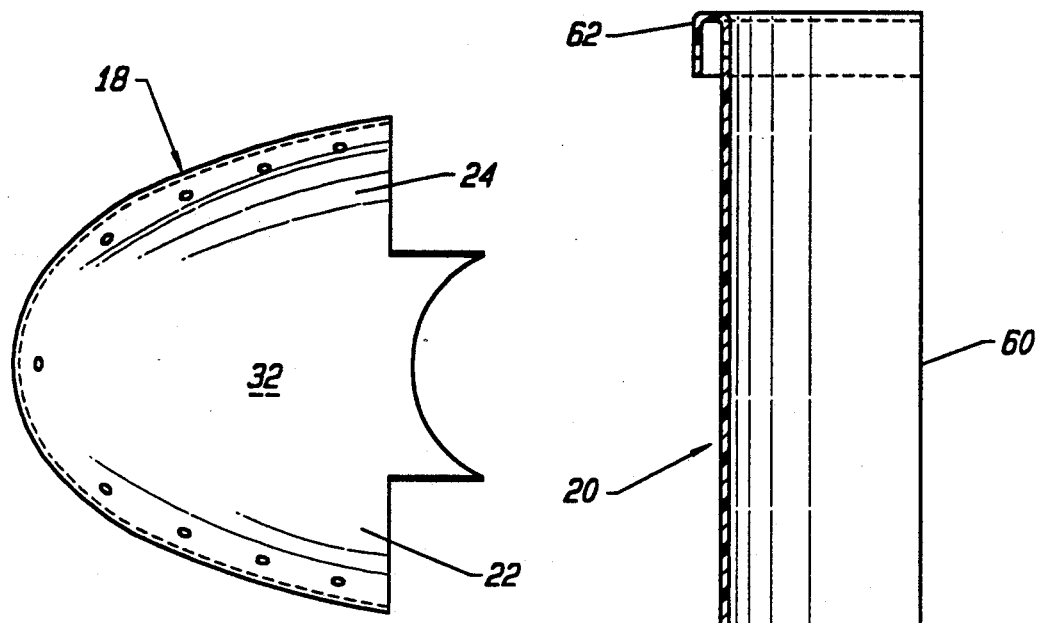
FIG. 4 is a top, plan view of the apparatus of FIG. 2.

Referring now to FIG. 1, a portion of a typical concrete mixer truck 10 is depicted in phantom line. The truck includes a rotatable drum 12, a hopper loader chute 14 for conveying concrete or other material into the interior of the drum, and a discharge chute 16 for conveying such material from the drum to a work site location.

The truck 10 has associated therewith two embodiments of apparatus constructed in accordance with the teachings of the present invention. One embodiment, designated by number 18, is employed with the hopper loader chute and the other embodiment, designated by reference numeral 20, is employed in combination with the discharge chute 16.

Apparatus 18 will first be described, with reference to FIGS. 1-5. Apparatus 18 including a liner 22 having the shape illustrated. The liner 22 including a liner wall 24 which is positionable over the fluent material support surface of the conveyor wall of hopper loader chute 14. The conveyor wall of chute 14 is, of course, that curved wall which is engaged by the concrete or other material being discharged to the chute 14, and it will be appreciated that the conveyor wall has an upper end, a lower end, and a generally upwardly disposed fluent material support surface extending substantially continuously between the upper and lower ends. In FIG. 3, the conveyor wall of chute 14 is designated by reference number 26, with the upper end of the conveyor wall 26 designated by reference numeral 28. The generally upwardly disposed fluent material support surface of the conveyor wall 26 is designated by reference numeral 30.

The liner wall 24 of liner 22 is positionable over the fluent material support surface 30 of the chute conveyor wall 26 to protect the fluent material support surface against impact and wear. The liner wall 24 has a bottom surface 34 which is for engagement with, and generally conforms to, the shape of the fluent material support surface. The liner wall has an upper end 36, a lower end 38, and a top surface 32 extending between the inner wall upper and lower ends.

Attachment means is provided for attaching the upper end of the liner wall 24 to the chute 14 at the upper end of conveyor wall 26. More particularly, the liner 22 includes a down-turned lip 42 at the upper end of the liner wall. The down-turned lip 42 and the liner wall 24 define a recess 44 which receives the upper end 28 of chute conveyor wall 26, as shown in FIG. 3.

Lip 42 is of a size and configuration to cover the entirety of the chute conveyor wall upper end to prevent contact between the chute conveyor wall upper end and the fluent material which is being discharged into the mixer truck. This deters against intrusion of the fluent material between the chute and the liner so that rust is unlikely to form in the chute 14. It should be noted that the liner is thickened at portion 46 where incidence of impact on the liner is greatest.

In the embodiment of FIGS. 2-5, lip 42 includes a downwardly extending leg 48 and a smoothly curved lip segment 50 connecting the downwardly extending leg to the liner wall.

Apertures 52 are formed at spaced locations along leg 48. Apertures 52 ar placed into communication with similar apertures formed in conveyor wall 26 and liner wall 24. Bolts or other suitable fasteners are positioned in and through the aligned apertures and secured in placed so that the lip and liner wall are affixed to the chute conveyor wall. Washers or other suitable elements are preferably utilized (as illustrated in FIG. 3) to ensure that no liquid will pass around the mechanical fasteners through the apertures.

An important aspect of the present invention resides in the particular material utilized in the construction of liner 22. More particularly, the disclosed liner is of unitary, molded plastic construction, preferably being formed from a polyolefin selected from a group consisting of polyethylene and polypropylene. Even more preferably, the liner is integrally formed of a cross-linked polyolefin which has been rotational molded. It has been found that such material particularly lends itself to construction of the present invention due to its toughness and durability.

Figure 6:
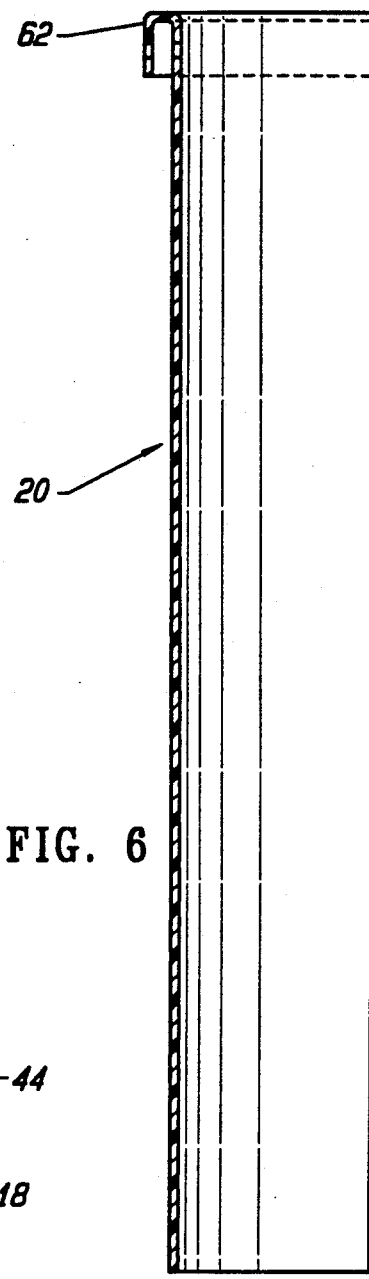
FIG. 6 is a cross sectional, side view of a second form of apparatus constructed in accordance with the teachings of the present invention as taken along the line 6—6 of FIG. 7.
Figure 5:
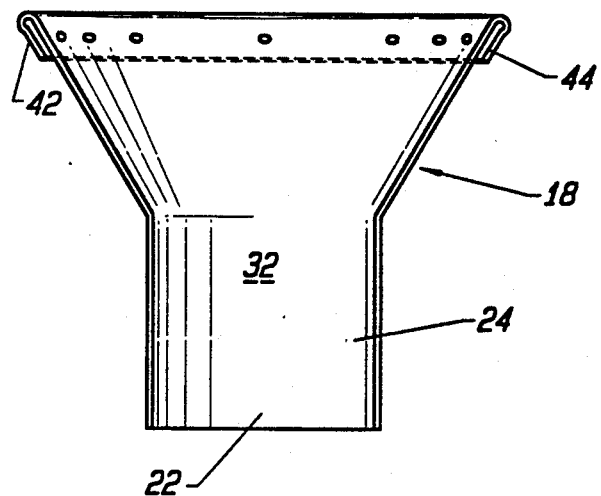
FIG. 5 is a frontal, elevational view of the embodiment illustrated in FIG. 2.
Figure 7:
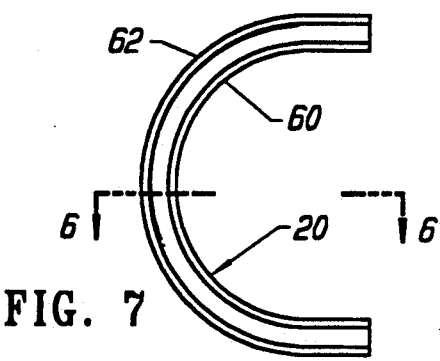
FIG. 7 is an end view of the apparatus of FIG. 6.

FIGS. 6 and 7 show an alternative embodiment of the apparatus, this particular embodiment being designated by reference numeral 20 and for use in conjunction with discharge chute 16, rather than hopper loader chute 14. Apparatus 20 differs from apparatus 18 only in the shape thereof, it being appreciated that the shape of the liner 60 of apparatus 20 is so configured as to conform to and cover the discharge chute 16. Both the liner wall 60 and the lip 62 of apparatus 20 are curved to conform to the generally U-shaped cross sectional configuration of the discharge chute 16. In the manner of the first embodiment of the apparatus, this embodiment 20 will hang or depend from the upper end of the discharge chute and otherwise be unattached thereto.

I claim:

1. Apparatus for use in combination with a mixer truck having a chute for conveying fluent material from a first location to a second location relative to said mixer truck, said chute having a conveyor wall with an upper end, a lower end, and a generally upwardly disposedly fluent material support surface extending substantially continuously between said upper and lower ends, said apparatus comprising:

a liner having a liner wall positionable over the fluent material support surface of said chute conveyor wall for protecting said fluent material support surface against impact and wear, said liner wall having a bottom surface for engagement with and generally conforming to the shape of said fluent material support surface, said liner wall additionally having an upper end, a lower end, and a top surface extending between said liner wall upper and lower ends; and attachment means for attaching the upper end of said liner wall to said chute at the upper end of the conveyor wall, said liner when so attached being otherwise unattached to said chute whereby said liner wall will depend from the liner wall upper end and whereby the liner wall bottom surface and the chute conveyor wall fluent material support surface will be capable of relative movement when said upper end of the liner wall is attached to the upper end of said chute conveyor wall, said liner including a down-turned lip at the upper end of said liner wall, said down-turned lip and said lower wall defining a recess for receiving the upper end of said chute conveyor wall, said lip at least partially comprising said attachment means.

2. The apparatus according to claim 1 wherein said liner is of unitary, molded plastic construction.

3. The apparatus according to claim 2 wherein said liner is integrally formed of a cross-linked polyolefin.

4. The apparatus according to claim 3 wherein said polyolefin is selected from a group consisting of polyethylene and polypropylene.

5. The apparatus according to claim 2 wherein said liner is of rotational molded construction.

6. The apparatus according to claim 1 wherein said lip is of a size and configuration to cover the entirety of said chute conveyor wall upper end to prevent contact between said chute conveyor wall upper end and said fluent material and deter against intrusion of said fluent material between said chute and said liner.

7. The apparatus according to claim 6 wherein said lip includes a downwardly extending leg and a smoothly curved lip segment connecting said downwardly extending leg to said liner wall, said attachment means additionally comprising mechanical fastener means extendable through said chute conveyor wall upper end, said downwardly extending leg, and said liner wall.

8. The apparatus according to claim 1 wherein said liner is thicker along a predetermined portion thereof than along the remainder thereof.

9. The apparatus according to claim 7 wherein said mechanical fastener means comprises a plurality of threaded mechanical fasteners spaced from one another along said lip.

10. The apparatus according to claim 9 wherein said chute is a mixer truck discharge chute, said liner wall bottom surface being of a size and configuration generally corresponding to the size and configuration of at least some of said discharge chute conveyor wall fluent material support surface.

11. The apparatus according to claim 9 wherein said chute is a mixer truck hopper loader chute, said liner wall bottom surface being of a size and configuration generally corresponding to the size and configuration of at least some of said hopper loader chute conveyor wall fluent material support surface.

* * * * *